April 29, 1930.  J. HUTTON ET AL  1,756,090

ADVERTISING SIGN USING REFLECTED LIGHT

Filed Nov. 5, 1928  2 Sheets-Sheet 1

J. Hutton & J. Bacon
INVENTORS

By: Marks & Clerk
ATTYS.

April 29, 1930. J. HUTTON ET AL 1,756,090
ADVERTISING SIGN USING REFLECTED LIGHT
Filed Nov. 5, 1928  2 Sheets-Sheet 2

J. Hutton & J. Bacon
INVENTORS.

By: Marks & Clerk
Attys.

Patented Apr. 29, 1930

1,756,090

UNITED STATES PATENT OFFICE

JAMES HUTTON, OF MONTON, AND JAMES BACON, OF LONDON, ENGLAND, ASSIGNORS TO JAMES BACON, OF LONDON, ENGLAND, AND HERBERT HEATHER, OF CATFORD, ENGLAND

ADVERTISING SIGN USING REFLECTED LIGHT

Application filed November 5, 1928, Serial No. 317,349, and in Great Britain November 30, 1927.

This invention relates to the improvement of illuminated advertising signs of the type using reflected light or where such light is not available artificial light could be utilized through the light glass.

In signs of the type operating by reflected light in use at the present time they are limited in their scope of effectiveness by being of a fixed nature and limited in subject matter or display variety.

The present invention has for its object to improve upon existing types of signs and thereby increase their adaptability and efficiency.

According to our invention we employ a rotary member having a plurality of stencils or display surfaces, suitably mounted in a rotatable manner, and adapted when rotated, to intermittently or continuously pass a portion of its said formed surface across the path of a beam of reflected or artificial light whereby the said stencils or display matter are/is reflected or illuminated so as to be optically projected in a given direction at an angle to the path of the beam of light.

The rotary member is of elongated shape with a plurality of flats or of travelling band or apron formation.

The sign is constructed to render the stencils or subject matter more striking in effect by the change in the light by means of colour effects or change in the type of lettering of the advertisement, and also the repetition of the subject matter. Such colour effects may be obtained by a variation of colours in the light transmitter and the view glass.

The advertisement frame, which is rotated, can be of a multi-sided box-shape, as for instance a square, hexagon, octagon, or the like and a reflector or mirror may be fixed at a suitable angle between the light transmitter and the sight hole or glass.

The multi-sided advertisement frame may be placed between the stand and the mirror reflector in order that the subject matter can be reflected or transmitted from the source of light to the sight hole or glass.

If desired the stencils or display matter may have the form of mirrors carried by the rotary member, thus obviating the necessity for an independent reflecting member.

The advertisement frame can be so constructed as to make it possible by means of standard sizes of letters to change the subject matter.

The invention is particularly applicable for the utilization of natural light, but in some cases where such light is not available artificial light could be utilized through the light glass.

The accompanying drawings illustrate embodiments according to the invention.

Figures 1, 2:
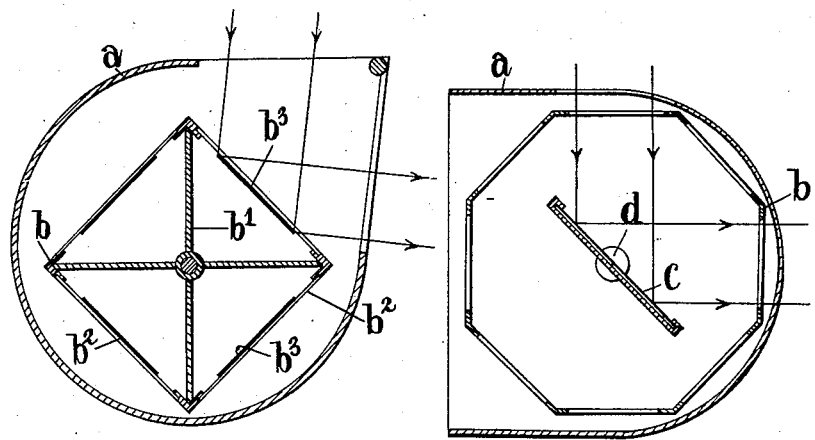
Figure 1 is a transverse section of a rotor having four sides.
Figure 2 is a section of sign having a rotor of eight sides.
Figures 5, 6:
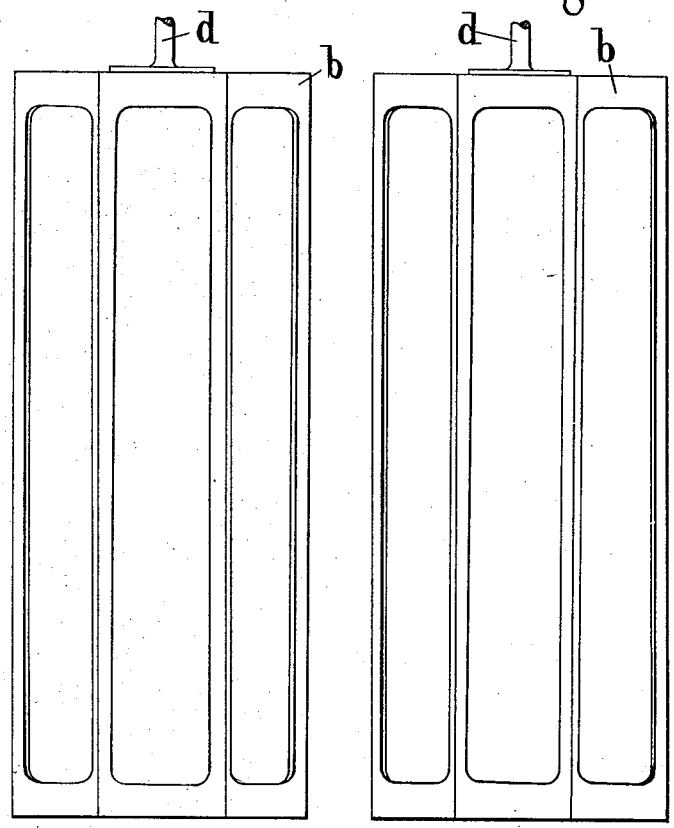
Figure 4:
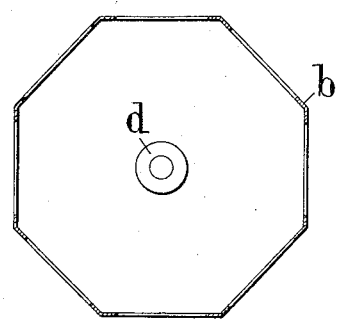
Figure 3:
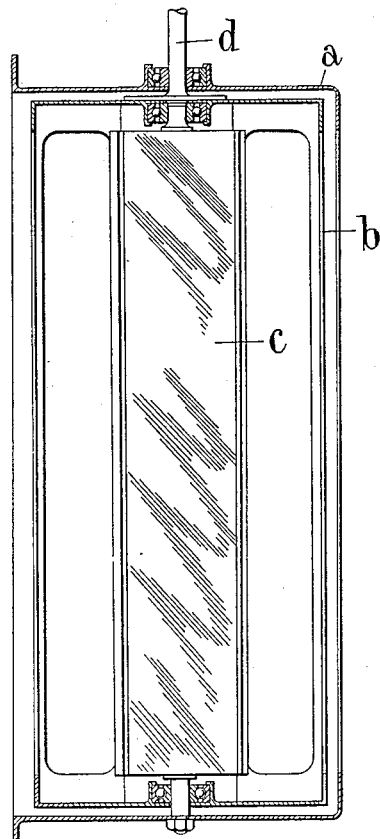

Figure 3 is a sectional plan thereof showing rotor bearings of ball-bearing type, Figure 4 is a section of rotor, and Figures 5 and 6 plans thereof carrying stencils or display matter of different character so that the rotors can be interchanged, or substituted one for the other, Referring to Figure 1 of the drawings, the sign comprises a casing $a$ of any suitable shape or design rotatably supporting therein a rotor $b$ divided into four compartments by walls $b'$ preferably darkened or coloured and having four transparent slats $b^2$ provided with silvered display matter $b^3$, that is to say, the display matter is either silvered on the surfaces of the slats or is in the form of separate mirrors adhering thereto. The arrangement of the sign is such that upon a beam of reflected or artificial light entering the casing in the direction indicated in the drawings, the mirrors constituting the display matter are illuminated and are thereby optically projected in a given direction.

Referring now to Figures 2 to 6 of the drawings, the casing $a$ supports a rotor $b$, as shown of eight sides, and a mirror or reflecting surface $c$ arranged in the inside of the rotor, which turns about round the mirror and between it and the light to give the desired display of subject matter or colour or advertisement effect. The axle $d$ is connected to a source of power such as an electric motor.

We claim—

1. A mechanical advertising sign comprising a rotor having a plurality of flat surfaces carrying display matter, and a relatively stationary casing within which the rotor is mounted, which casing is provided with two light transmitting apertures disposed at an angle to one another so that light entering the casing through one of the apertures illuminates the flat surfaces in turn and is reflected by mirror means disposed so as to cause display matter to be made visible to the eye of the observer through the other aperture in the casing.

2. A mechanical advertising sign comprising a rotor having a plurality of flat surfaces each carrying display matter in the form of a mirror or mirrors, and a relatively stationary casing within which the rotor is mounted, which casing is provided with two light transmitting apertures disposed at an angle to one another so that light entering the casing through one of the apertures illuminates the flat surfaces in turn and is reflected by means of the mirror or mirrors so as to cause the display matter formed thereby to be made visible to the eye of the observer through the other aperture in the casing.

In testimony whereof we have signed our names to this specification.

JAMES HUTTON.
JAMES BACON.